(12) United States Patent
Gennaro et al.

(10) Patent No.: US 6,317,834 B1
(45) Date of Patent: Nov. 13, 2001

(54) BIOMETRIC AUTHENTICATION SYSTEM WITH ENCRYPTED MODELS

(75) Inventors: Rosario Gennaro, Bronx; Shai Halevi, Hartsdale, both of NY (US); Stephane Maes, Danbury, CT (US); Tal Rabin, Riverdale, NY (US); Jeffrey Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,214

(22) Filed: Jan. 29, 1999

(51) Int. Cl.⁷ ................................. H04L 9/32; H04L 9/16
(52) U.S. Cl. ..................... 713/186; 713/151; 713/182; 380/44; 380/286
(58) Field of Search ..................... 713/151, 182, 713/186; 380/44, 45, 46, 47, 259, 286

(56) References Cited

U.S. PATENT DOCUMENTS

| | | | |
|---|---|---|---|
| 5,991,407 | * 11/1999 | Murto | 380/23 |
| 6,038,315 | * 3/2000 | Strait et al. | 380/23 |
| 6,041,410 | * 3/2000 | Hsu et al. | 713/186 |
| 6,076,167 | * 6/2000 | Borza | 713/201 |
| 6,084,968 | * 7/2000 | Kennedy et al. | 380/259 |
| 6,085,322 | * 7/2000 | Romney et al. | 713/176 |
| 6,122,737 | * 9/2000 | Bjorn et al. | 713/186 |
| 6,151,676 | * 11/2000 | Cuccia et al. | 713/176 |
| 6,167,517 | * 12/2000 | Gilchrist et al. | 713/186 |

* cited by examiner

Primary Examiner—Thomas R. Peeso
Assistant Examiner—Justin T. Darrow
(74) Attorney, Agent, or Firm—F. Chau & Associates, LLP

(57) ABSTRACT

A method of performing biometric authentication of a person's identity including a biometric template prior to storing it in a biometric database. The encryption algorithm encrypts the biometric template using a pass-phrase, known only to the individual, to generate the cryptographic key used to store and retrieve the biometric template. When an individual wishes to access a secured resource, he must be authenticated by providing an identifier which is used to retrieve the appropriate record. He must also provide the correct password to allow the system to decrypt the model.

22 Claims, 12 Drawing Sheets

BIOMETRIC AUTHENTICATION SYSTEM WITH ENCRYPTED MODELS

FIELD OF THE INVENTION

The present invention relates to a method and a system for verifying the identity of an individual, and more particularly, a method and a system for providing enhanced identity verification security utilizing encryption and biometric techniques.

BACKGROUND OF THE INVENTION

In today's information age, the competitive edge of many companies and public trust in government institutions can depend on the security of the information held in its databases. Breaches of that security are a highly topical issue for both designers and users of database systems.

Therefore, it is desirable to provide a secure method to both identify and authenticate users of information services. Conventional biometric systems provide a partial solution to the aforementioned need. As used herein, the term "biometric" refers to the automated process of determining positive identification on the information contained within one or more of an individual's unique physiological characteristics. In general, a biometric authentication system includes a statistical model for a particular user, such as a mixture Gaussian speech model. A person is considered to be authenticated if the system provides a score below a rejection threshold. Other persons in the population, due to physiological differences, score much more poorly and likely appear outside the acceptance region. The biometric statistical model is represented using a set of statistical parameters, such as the average spectrum. The statistical parameters are typically stored in a data structure as part of a database used by the authentication algorithm. Fingerprints, hand geometry, voice pattern, retinal pattern, iris scans, signatures and others all constitute sources of unique physiological characteristic which can establish identity.

Traditional biometric systems store their biometric information in databases in an unencrypted form. There are drawbacks in storing information in such manner. Whenever information is stored in unencrypted form this situation can lead to any number of planned attacks by prospective unauthorized individuals. It may be possible, for example, for an unauthorized user to copy a parameter of an authorized user in such a way as to gain access to a system. For example, if the database was stolen by a prospective attacker, the attacker would be able to choose the most closely matching statistical model in the database and claim to be that person.

Therefore, there is a need for a system that stores biometric information in a secure manner so as to prevent the occurrence of theft and attacks from unauthorized personnel.

SUMMARY OF THE INVENTION

According to the present invention, there is provided a method and a system utilizing encrypted bio-characteristics for verifying the identity of an individual to permit access to a general database or other secured resource.

In one aspect of the invention, a method for the secure handling of data, comprising the steps of: acquiring a database of personal identifiers and data comprising repetitively: acquiring a biometric sample; acquiring a personal identifier; acquiring a password; generating a biometric model from the biometric sample; creating a first encryption key from the password; performing an encryption operation on the biometric model; storing an encrypted biometric record in a biometric database wherein the biometric record includes the encrypted biometric model and personal identifier stored in plaintext;

The method further provides means for verifying the identity of an individual to authorize access to a general database comprising the steps of: acquiring a current biometric sample; acquiring a current personal identifier; acquiring decryption key generation data; comparing the personal identifier with the database, and on a match with a personal identifier in the database; creating a decryption key from said decryption key generation data; performing a decryption operation on the retrieved biometric record utilizing the decryption key to decrypt the encrypted biometric model from the retrieved record; comparing the decrypted biometric model with the current biometric sample to determine statistical equivalence; when statistical equivalence is found verifying the individual as authorized to access the general database.

The method and system preferably further provides re-encrypting the retrieved decrypted biometric record comprising the steps of: creating a second encryption key; performing an encryption operation on said retrieved decrypted record utilizing the second encryption key; restoring the re-encrypted record in the biometric database.

According to another aspect of the invention, the encryption key is derived from a random combination of answers provided by the individual during a challenge/response session, where the system prompts the individual with a series of challenge questions. The challenge questions are preferably directed to personal information unique to each individual. An encryption key is created by concatenating a subset of the provided answers. The method, according to the present embodiment, comprises the steps of: acquiring a database of personal identifiers and data comprising repetitively: acquiring a biometric sample; acquiring a personal identifier; prompting the individual with a series of challenge questions; creating a random challenge list including a set of integers, where each random integer is an index to one of the challenge questions (i.e a pointer); concatenating those answers to challenge questions whose index is an element of the challenge list to create a first encryption key; generating a biometric model from the biometric sample; performing an encryption operation on said biometric model using the first encryption key; storing an encrypted biometric record in the encrypted biometric database wherein the biometric record includes the encrypted biometric model, wherein the encrypted answers to challenge questions. The personal identifier is preferably stored in plain text and the challenge list in plain text.

The means for verifying the individual includes means for receiving answers from individuals to questions contained in the retrieved challenge list. The answers can then be concatenated to create the decryption key to recover the biometric model.

According to a further aspect of the invention, the derivation of the secret key is made robust to mistakes in answering the challenge questions, requiring the individual to answer only m of the n challenge questions correctly (i.e. (m of n) threshold test). The present embodiment is advantageous in that the entire key is recoverable whenever any m shares of the key are available. In accordance with the present embodiment, the encryption key is divided into n-shares at an enrollment step and the biometric record is accordingly encrypted with the n-share key. At a verification step, answering any m out of n challenge questions correctly yields m-shares of the entire n-share key thereby permitting decryption of the biometric record.

The presently described embodiment provides means for verifying the identity of an individual to authorize access to a general database comprising the steps of: prompting the user for a personal identifier; comparing the personal identifier of a given individual with the database, and on a match with a personal identifier in the database retrieving the biometric record; extracting the challenge list from the retrieved biometric record and asking challenge questions whose index matches the elements (i.e. pointers) of the challenge list; combining the received answers to the challenge questions to create a decryption key; performing a decryption operation on answers along with decrypting the biometric model; generating a new challenge list randomly; and using the answers from the decrypted information to form a new encryption key. Preferably, the model and the answers are re-encrypted and stored with the new challenge list.

The re-encrypting the retrieved biometric record preferably comprising the steps of: creating a second encryption key; performing an encryption operation on said retrieved decrypted record utilizing the second encryption key; restoring the re-encrypted record in the biometric database.

The system may optionally provide the individual who fails in the biometric portion of the test an additional opportunity by asking additional questions in a second challenge/answer session.

According to yet a further aspect of the invention, derivation of the (m,n) thresholding scheme, as described above, is further modified whereby the challenge questions may incorporate some aspect of the individuals biometric. For example, in contrast to the previous aspects where the challenge questions were all directed to personal information such as social security number or address, for example, the present embodiment incorporates certain aspects of the individual's biometric, such as a challenge question directed to an aspect of the individual's biometric stated as: "How large is your hand?", or "Is your voice more like person A or B?".

In a yet further embodiment, the biometric record is encrypted with a large randomly generated encryption key. The large key is chosen once for each biometric record and not updated. The large key is used to encrypt the biometric record, and then the key is encrypted with a second, smaller encryption key derived from user supplied data as described by previous embodiments. This embodiment further contemplates using two databases. A first database would store the biometric model and personal information from the challenge/response part of the enrollment, encrypted with the large key. A second database would store the large key, encrypted by the smaller second key. The present embodiment is advantageous in that only the large encryption key needs to be re-encrypted at each authorization session rather than the entire database record.

These and other advantages of the invention will become more fully apparent when the following detailed description of illustrative embodiments thereof, which is to be read in conjunction with the accompanying drawings in which the same reference numerals are used throughout the various figures to designate same or similar components.

DETAILED DESCRIPTION OF PREFERRED EMBODIMENTS

As used herein, the term "biometric" means any physiological characteristics containing information which is unique for an individual. Example biometrics are a person's fingerprint or irises.

In prior art biometric systems, individuals seeking enrollments are prompted by the system to provide a personal identifier and a biometric sample from which a corresponding biometric record is created and stored as part of the biometric database.

During verification, any individual from the general population seeking access to the general database is prompted by the system to supply a personal identifier which is used to find a matching biometric record. If a matching record is found, the system further prompts the individual for a current biometric sample. The current biometric sample is compared to the stored biometric sample contained as part of the matched record to determine the degree of statistical equivalence. If the equivalence score exceeds some threshold, the individual will be considered authorized to access the general database.

Figure 1:
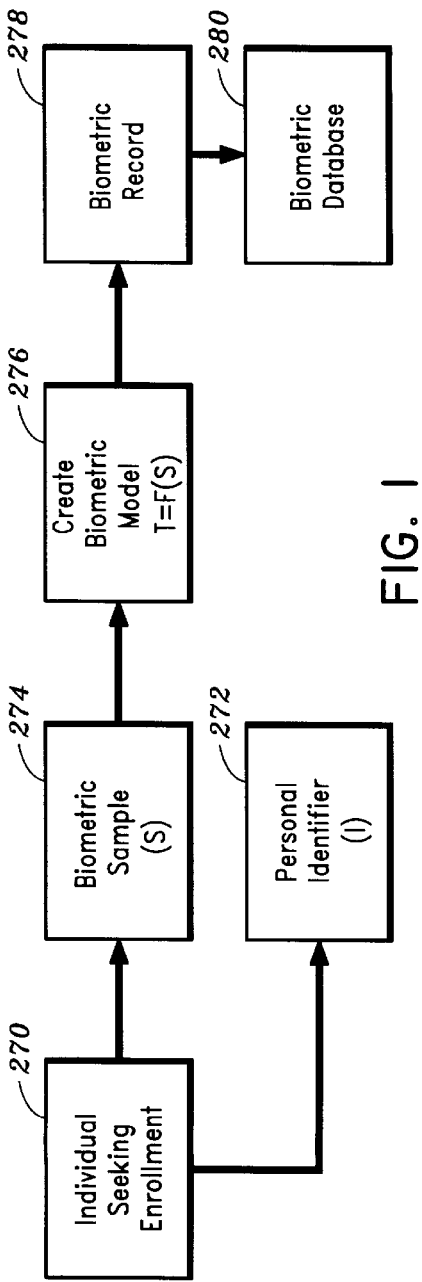
FIGS. 1 and 2 are diagrams illustrating the process steps associated with enrollment and authorization in a biometric database in accordance with the teachings of the prior art.
Figure 2:
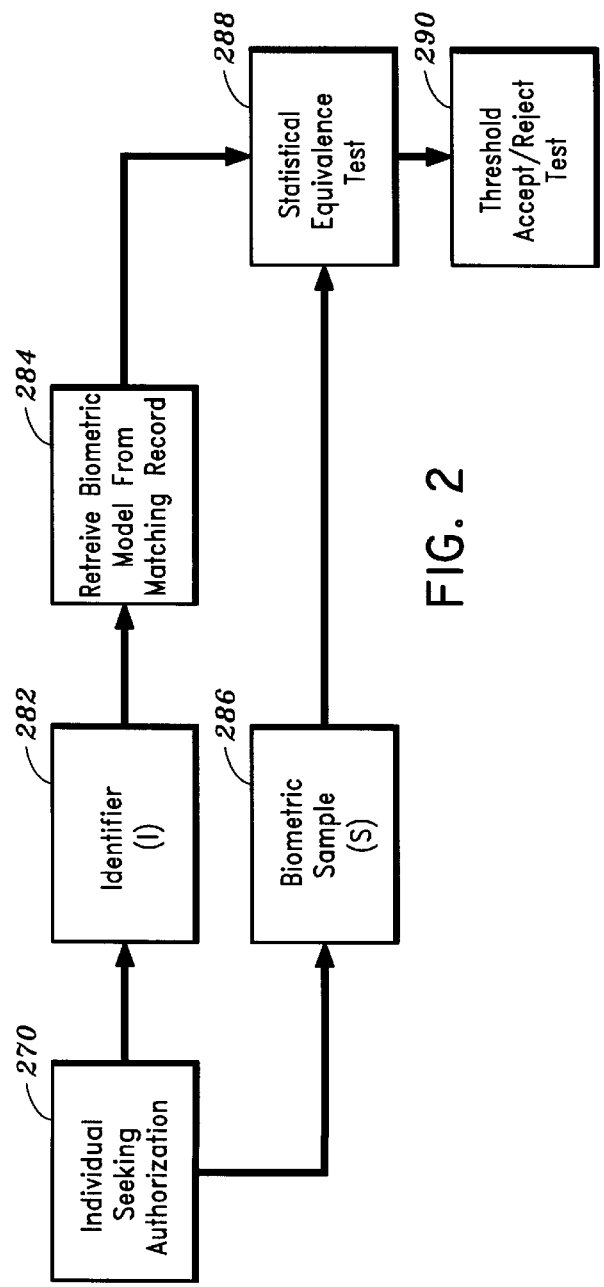

Referring now to FIGS. 1 and 2, which illustrate the detailed process steps of enrollment and verification in accordance with the prior art. It is to be appreciated that once all individuals have been enrolled, the biometric database is considered to be fully constructed. As previously generally described, during enrollment each individual 270 seeking enrollment supplies personal identification data 272 and a biometric sample 274. The biometric sample 274 may include, for example, a fingerprint, iris, or retinal pattern. It will be obvious to those skilled in the art that the biometric sample may be any one of a number of standard bio-characteristics. The personal identifier is preferably, a name or other non-secret identifier, to be later used during verification as an index to find a matching database record. For each individual 272 wishing to enroll, a single biometric record 278 is created including his or her created biometric model 276 along with the provided identifier 272. The biometric record is stored in the database 280 along with similarly created biometric records.

Having created the biometric database at the enrollment step, any individual from the general population seeking access to the general database must first be verified (i.e. authorized to gain access to the general database) by the system. It is to be appreciated that only previously enrolled individuals may potentially be authorized by the system at a verification session. The biometric database facilitates the verification process.

A verification session is said to occur each time any individual seeks access to the contents of the general database. The process of verifying an individual so as to authorize his or her access to the general database includes: prompting the individual for a personal identifier 282 to be used as a retrieval index to find a database record 284 with a matching personal identifier. Failure to find a matching identifier will result in declaring the individual unauthorized thereby terminating the verification session. If, however, a matching biometric record 284 is found, the individual 270 is further prompted to provide a current biometric sample 286. For example, an individual may be prompted to provide a handwriting, speech, or fingerprint sample. Note that the provided sample must be of the same type as that requested during enrollment. A statistical equivalence test 288 is performed comparing the individuals provided biometric sample 286 with the biometric model 284 contained as part of the retrieved matching record and a threshold score is generated from the comparison. Based on the threshold score an accept/reject decision 290 is made to determine whether the individual is determined to be who he claims to be.

It is to be appreciated that the conventional biometric system illustrated in FIGS. 1 and 2, is vulnerable to attacks. Specifically, if the database was stolen by a prospective attacker, the attacker would be able to choose the most closely matching statistical model in the database and claim to be that user. This vulnerability is a direct consequence of storing the biometric data in unencrypted form.

Figure 3:
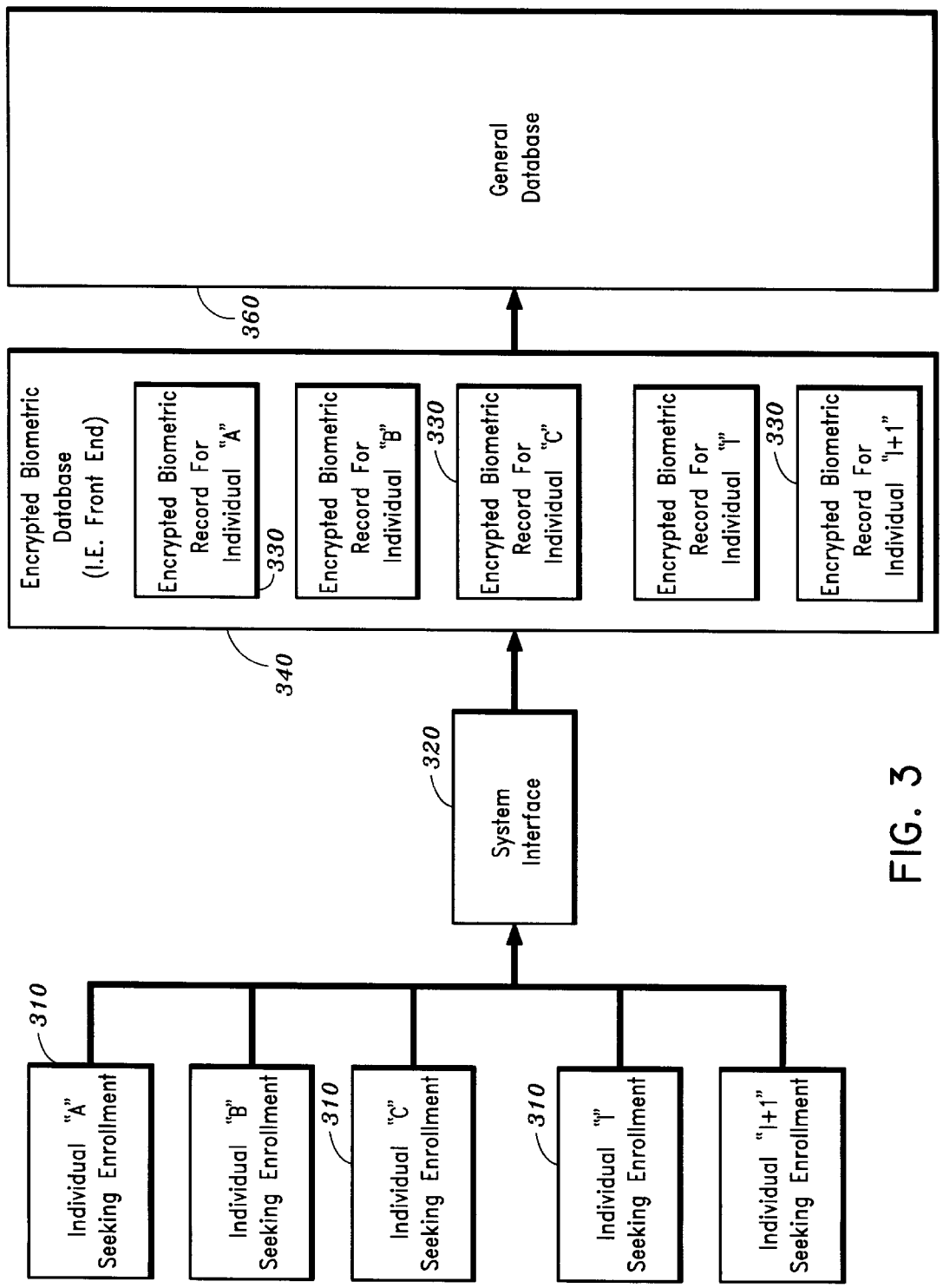
FIG. 3 is a general block diagram of the organization of a biometric database according to the present invention.

Referring now to FIG. 3, which illustrates a block diagram of a biometric authentication system in accordance with the teachings of the present invention. Each individual 310 seeking enrollment is prompted to provide enrollment data including a biometric sample, a personal identifier and encryption key generation data. An encrypted biometric record 330 is created for each enrolled individual and stored as part of the biometric database 340.

Once all users have been enrolled, the encrypted database is used at subsequent verification sessions to verify the authenticity of any individual who desires access to the general database 360. The details of which will be provided below. It is to be appreciated that the present invention is usable with any general database, and is not, in any way, limited to use with or dependent on any details (e.g. contents) or methodologies of a particular database configuration. It should also be appreciated that the elements shown throughout the figures may be implemented in various forms of hardware, software, or combinations thereof.

Figures 4A, 4B:
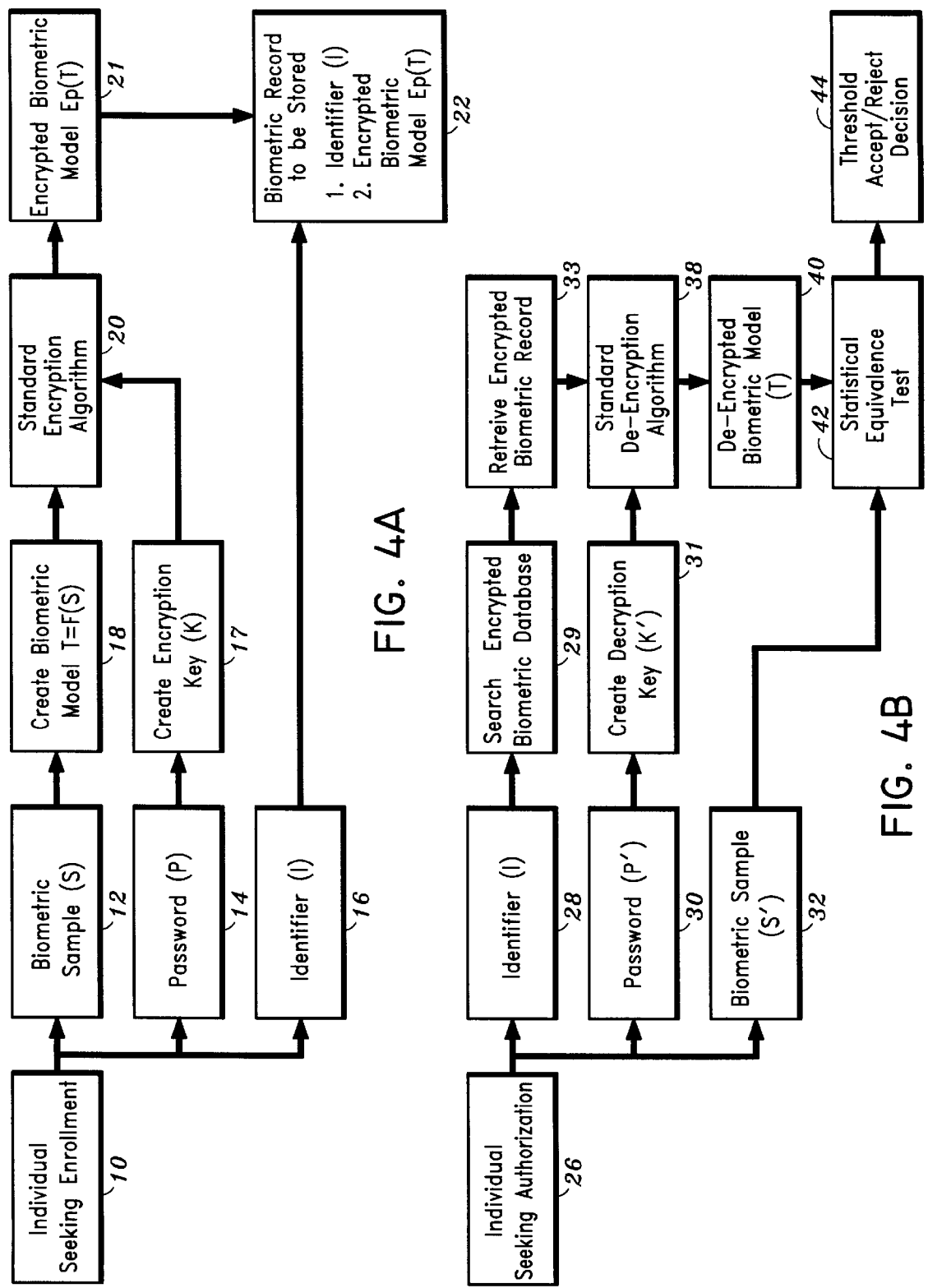
FIGS. 4a and 4b are system diagrams illustrating process steps associated with enrollment and authorization according to the present invention.

FIG. 4a shows illustrative steps associated with enrolling a plurality of individuals in the encrypted biometric database 340 in accordance with an embodiment of the present invention. It should be appreciated that a separate and distinct encrypted biometric record is created for each individual wishing to enroll. FIG. 4a describes the enrollment process for a single individual. Specifically, block 10 illustrates three inputs supplied by an individual wishing to enroll; a biometric sample (S) 12, a password (P) 14, and a personal identifier (I) 16. The personal identifier (I) may, for example, be the individuals name or an equivalent identifying string. Alternate embodiments may forego the identifier (I) input whereby the system would, instead, perform an exhaustive search using the password (P) as an index against every record in the database seeking a successful decryption.

The three inputs are preferably entered into the system as speech patterns via microphone means. Other embodiments, however, may consider alternate means. For example, with specific reference to the biometric sample (S) input means may include fingerprint readers, hand geometry readers, retinal scanners, DNA readers, dynamic signature readers, and other biometric input apparatus known in the art. Further, while FIG. 4a describes the biometric sample (S) 12 being provided as a separate and distinct input, it is to be appreciated that the sample may be derived as a by-product of an individuals responses to other system prompts. For example, the password input response may be used to implicitly derive the biometric sample (S). The capability to implicitly derive the biometric sample holds true for the present embodiment and for all other contemplated embodiments discussed herein.

At block 18 a biometric model (T=f(S)) is created from the biometric sample (S). At block 17, An encryption key (k) is created from the password (P) input. The encryption key (k) is provided as input to a symmetric key encryption algorithm, at block 20 to encrypt the biometric model (T). The particular encryption algorithm selected is not critical for purposes of the present invention, however, it is preferred that the algorithm be a secret key (symmetric), such as data encryption standard (DES) and not a public key algorithm.

Referring now to FIG. 4b, once the biometric model has been encrypted, the encryption key (k) is discarded by the system. That is, it is not stored for later use, but rather re-generated, at block 31, during verification from a user supplied input, password (P') at block 30.

Further, as is well known in the art, encryption systems that use a password to encrypt data typically employ "salt", which is the addition of some random information that is added to the material to be encrypted. This serves to prevent identical information, possibly from different users, from encrypting to the same result. Both the salt and the resulting encrypted message are stored together. With respect to all embodiments discussed herein, the optional addition of "salt", wherever appropriate, is within the scope of the present invention.

Referring again to FIG. 4a, a single biometric record is stored for each individual at block 22. The record includes a personal identifier input (I), stored as plaintext, and an encrypted biometric model ($E_k(T)$). It is to be appreciated that the present invention is not limited to storing only the data elements defined by the various embodiments. The record may be comprised of whatever additional encrypted or unencrypted information the system designer deems necessary, which may be more or less information than that described herein.

Referring now to FIG. 4b, a block diagram illustrates the process steps associated with a verification session. The focus of verification is to verify the identity of any individual desiring access to the general database. Verification presumes the prior creation of an encrypted biometric database. The block/flow diagram steps illustrated at FIG. 4b are performed each time an individual's identity must be verified by the system to either grant or deny him or her access to the database.

In block 26 an individual seeking access to the database is prompted for a personal identifier (I). The system will attempt to match the personal identifier (I) with one of the personal identifiers (I) stored in plaintext as a component of each encrypted biometric record. If no matching record is found the individual cannot be verified and his authorization status will be declared as "failed". If, however, a matching record is found, an encrypted biometric record with matching personal identifier (I) will be retrieved. At block 30, the individual is then further prompted to provide a password (P'). The system uses the password (P') to create decryption key (k') at block 31. The encrypted biometric record will be successfully decrypted only if the password (P') is identical to the password (P), and thus the identical key used to initially encrypt the record.

The decryption key (k'), block 31, is provided as input to a standard decryption algorithm at block 38. The particular decryption algorithm is not critical for purposes of the present invention, and as such, any decryption algorithm known in the art may be used. It is only required that the decryption algorithm be a secret key and not a public key algorithm. The retrieved encrypted biometric record at block 33 is provided as input to the decryption algorithm, along with the decryption key (k') where an attempt is made to decrypt the retrieved biometric record. If the decryption is unsuccessful, the individual cannot be verified and his or her authorization status will be declared as "failed", thereby terminating the verification session. Otherwise, if the decryption of the encrypted biometric record is successful, a decrypted biometric model (T) is extracted from the decrypted biometric record at block 40. In block 32, an individual is further prompted to provide a current biometric sample (S'). The provided biometric sample (S') must be of the same type requested at enrollment (See block 12 at FIG. 4a). At block 42, the provided biometric sample (S') is compared with the decrypted biometric model (T) for statistical equivalence and a statistical equivalence score is generated therefrom. The higher the computed score the higher the statistical equivalence. At block 44, if the score is above some predetermined accept/reject threshold the individuals authorization status is declared as "failed". Otherwise, an acceptable score will result in authorizing the individual 26 access to the database.

Figure 5:
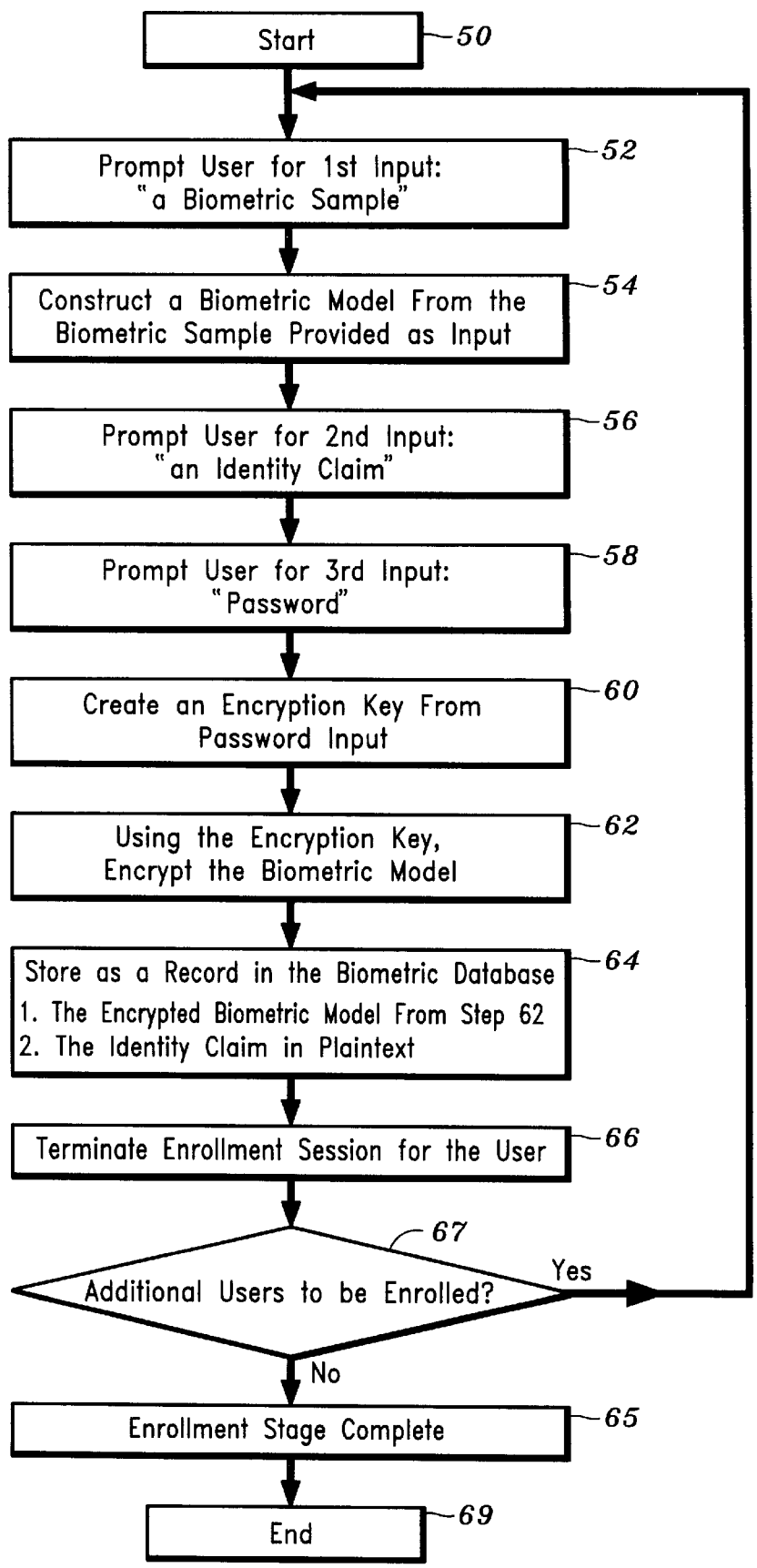
FIG. 5 is a flowchart illustrating method steps associated with enrolling an individual in accordance with a biometric authentication system according to the present invention.

FIG. 5 is a flowchart illustrating the method steps associated with enrollment in accordance with the first embodiment. The method steps described at FIG. 5 correspond to the process blocks illustrated in FIG. 4a. At step 52 an individual is prompted for a biometric sample (S). From the provided sample, the system constructs a biometric model, T=f(S), at step 54. At step 56, an individual is prompted for a personal identifier (I). At step 58, an individual is prompted for a password (P). At step 60, an encryption key (k) is created from the provided password (P). At step 62, the encryption key (k) is used in conjunction with a standard secret key algorithm to encrypt the biometric model ($E_k(T)$). At step 64, a biometric record is created including; the encrypted biometric model, the personal identifier in plaintext, $\{I, E_k(T)\}$. At step 66, the enrollment session is considered complete for that individual 26. Step 67 is a decision step to determine if there are other individuals wishing to be enrolled in the system. If so, the process returns to step 52, otherwise the database is considered as fully constructed. It is to be appreciated that although the process step as illustrated in FIG. 5 is explained for enrollment of a single user, the system according to the present invention is capable of enrolling multiple users at the same time, or preferably, by interleaving enrollment sessions and authentication sessions.

Figure 6:
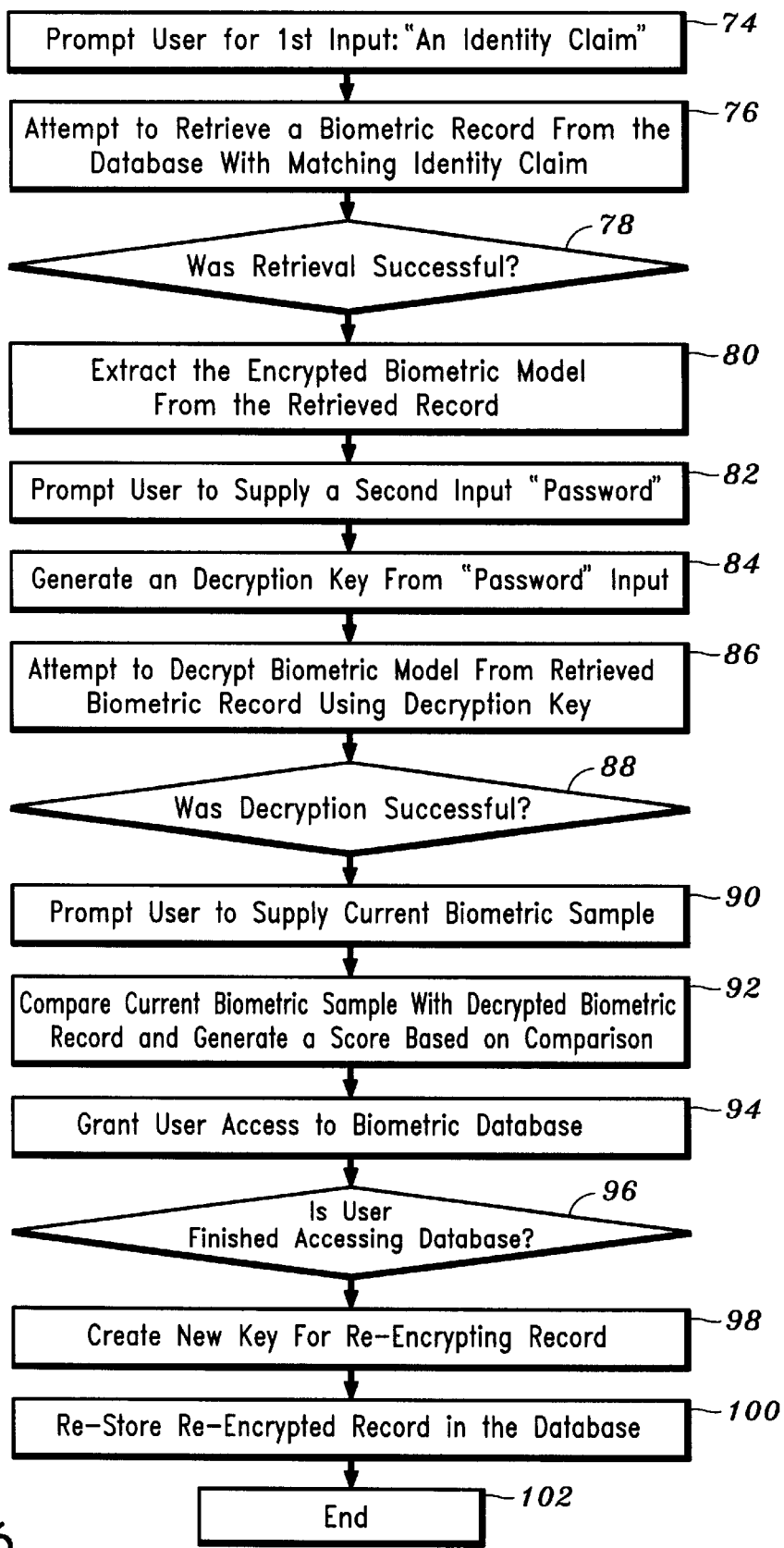
FIG. 6 is a flowchart illustrating method steps associated with authenticating an individual in accordance with an illustrative embodiment of a biometric authentication system according to the present invention.

FIG. 6 is a flowchart illustrating the method steps associated with verification in accordance with the first embodiment. The method steps described at FIG. 6 correspond to the block diagram illustrated in FIG. 4b. At step 74 an individual 26 is prompted by the system for a personal identifier (I). At step 76, the system will attempt to match the provided identifier with personal identifiers stored as part of each biometric record. Step 78 is a decision step to determine whether biometric record was found with a matching personal identifier. If not, the authorization session terminates at step 79 where the individual cannot be verified and his authorization status is declared as "failed". Otherwise, if a matching biometric record is found, the encrypted biometric model, $E_k(T)$, will be retrieved. At step 82, an individual is further prompted by the system to provide a password (P'). At step 84, the system will create a decryption key (k') from the password (P'). At step 86, the decryption key (k') is used in conjunction with a standard decryption algorithm to attempt to decrypt the retrieved biometric record. Step 88 is a decision step to determine whether the decryption was successful. If not, the verification status terminates at step 89, with the authorization status being declared as "failed". Otherwise, the retrieved biometric model is successfully decrypted and extracted from the record. At step 90, the individual is further prompted to provide a current biometric sample (S'). The sample type must correspond to the sample provided at enrollment. At step 92, the provided sample is compared with the decrypted biometric model (T) for statistical equivalence. A statistical equivalence score is generated from the comparison. The lower the computed score the higher the statistical equivalence. Step 93 is a decision step to determine if the computed score is acceptable. If not, the process terminates at step 91, where the users authorization status is declared as "failed". If, however, an acceptable score will result in granting the individual access to the database at step 94. Step 96 is a decision step to determine whether the individual has finished accessing the database, if not the process loops until such time.

As explained in FIG. 5 for enrollment of users, the illustrative system according to the present invention is capable of verifying multiple users by interleaving enrollment sessions.

If the individual changes his password, a new encryption key will be created at step 98. The database record will then be re-encrypted using the newly created encryption key in conjunction with a standard encryption algorithm at step 100. The process terminates at step 102.

It is readily apparent to one skilled in the art that biometric systems are vulnerable to a "playback" attack where intruders record and playback a valid user's authentication data. According to another illustrative embodiment of the present invention, a key is derived from a randomly chosen subset of answers obtained as a result of conducting a challenge question/answer session with the individual. The details of which will be provided below.

Figure 7A:
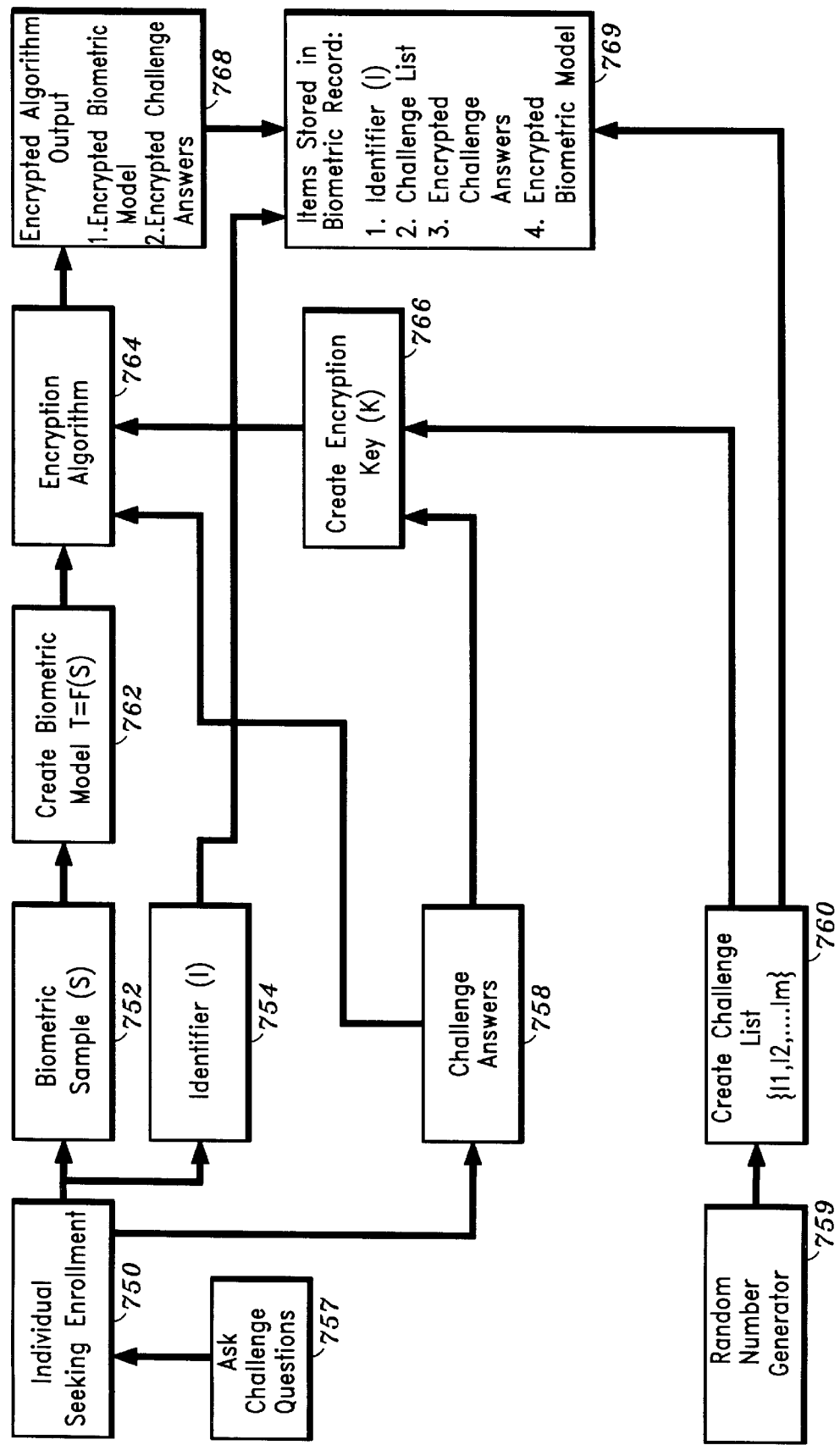
FIGS. 7a and 7b illustrate process steps associated with enrollment and authorization in accordance with an alternative biometric authentication system according to the present invention.

Referring to FIG. 7a, a block/flow diagram is shown of an enrollment process according to another embodiment of the present invention. An individual wishing to enroll in the database (block 750) provides inputs including a biometric sample (S) and an identifier (I). In process block 762 a biometric model, T=f(S), is created from the biometric sample (S). In process block 757 the individual is prompted with a series of challenge questions, {q1,q2, . . . ,qn}. The challenge questions are a series of system prompts, preferably regarding personal information. For example, the individual may be prompted to provide answers to questions directed to personal information concerning that individual's zip code, telephone number or birth date. At block 758, the answers to the challenge questions are recorded by the system, {a1,a2, . . . ,an}. In block 759, a random number generator generates m random values, where m is some positive integer value less than the total number of challenge questions (Q1–Qn) posed to the user at block 757. The m random numbers generated at block 759 are supplied to block 760 to form a challenge list, {i1,i2, . . . im}. The challenge list is supplied to block 766 along with the challenge answers, provided by block 758, to generate the encryption key (k). At block 766, the encryption key (k) is generated by concatenating those challenge answers from block 758 whose index match the elements in the challenge list. For example, assume that the m randomly generated integers that comprise the challenge list consist of 4 elements {2,4,7,9}. In actual operation, the number of integers in the challenge list can be any number m where(m<n). For the present example, challenge answers with index 2,4,7, and 9 would be concatenated to form the encryption key, k=a2|a4|a7|a9.

Prior to forming the encryption key (k), the concatenated answers are preferably first hashed using any well known hashing algorithm. The hashed result then becomes the encryption key (k) which is used to encrypt both the biometric model (T) and the full set of answers {a1,a2, . . . an}. At block 764, the biometric model (T) is encrypted using the generated encryption key as input to an encryption algorithm. The particular encryption algorithm is not critical for the purposes of the present application, therefore any known encryption algorithm in the art may be used at block 764. The biometric model and the full set of answers are combined and encrypted $E_k((a1,a2, . . . an), T)$ as part of the biometric record at block 769. The biometric record is therefore comprised of the personal identifier and challenge list in plaintext, along with the encrypted answers and biometric model;

{I, {i1, . . . ,im},$E_k$({a1,a2, . . . an}, T)}

A single instance of the full set of challenge questions {q1,q2, . . . qn} can be preferably stored in a separate part of the database in unencrypted form to conserve memory. It is to be appreciated that storing the challenge questions in unencrypted form will not compromise the integrity of the database.

Figure 7B:
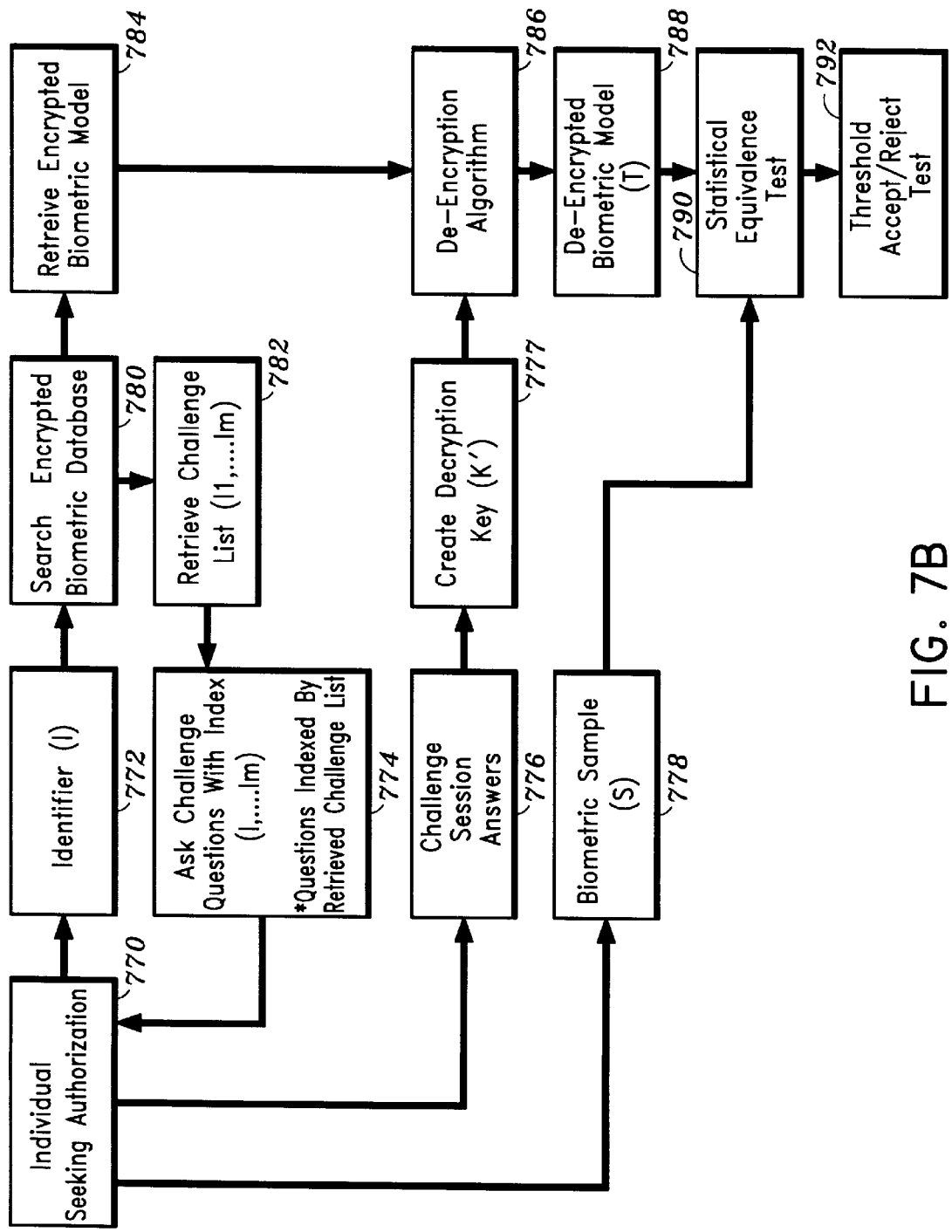

Referring now to FIG. 7b, a system block diagram is illustrated describing the process steps for an authorization session in accordance with the present embodiment. An individual seeking authorization at block 770 is prompted to provide a personal identifier (I) at block 772. The provided personal identifier is used to find a matching record in the database. If a matching biometric record is found, two items from the matching record will be retrieved. The first item retrieved, at block 782, is the challenge list. The second item, the encrypted biometric model and challenge answers, is retrieved at block 784. At block 776, the system initiates a challenge question/answer session with the individual seeking authorization by asking those challenge questions from enrollment whose index match the elements of the retrieved challenge list. For example, if the retrieved challenge list consists of elements (1,5,6) then the system would challenge the individual with challenge questions x 1,5 and 6. At block 776, the system then creates a decryption key (k') by concatenating the individual's responses to the challenge questions. At block 786, the generated decryption key (k') is provided as input to a standard decryption algorithm in an attempt to decrypt the retrieved encrypted biometric model (T). It is important to note that if the individual provides a single incorrect answer the resulting decryption key will not successfully decrypt the record thereby resulting in the users authorization status being declared as failedY. If, however, the individual provides all correct responses to the challenge questions the record will be successfully decrypted at block 788. The individual will then be further prompted to provide a current biometric sample (S) at block 778. The current biometric sample (S) is then compared with the decrypted biometric model (T) at block 790 for statistical equivalence and a statistical equivalence score is generated therefrom. The higher the computed score the higher the statistical equivalence. At block 792, if the score is more than some predetermined accept/reject threshold the individuals authorization status is declared as "failed". Otherwise, an acceptable score will result in the individual being verified and as such granting that individual access to the database. Prior to re-storing the record in the database, a new encryption key is generated for the purpose of re-encrypting the retrieved record. The new encryption key is created by generating a new challenge list by randomly generating a new set of m integers and forming a challenge list therefrom. It is to be appreciated that each time a record is retrieved, the record will be re-encrypted with a new encryption key prior to restoring that record in the biometric database. In addition, a new challenge list will replace the old challenge list and also stored as part of the re-encrypted record.

Figure 8:
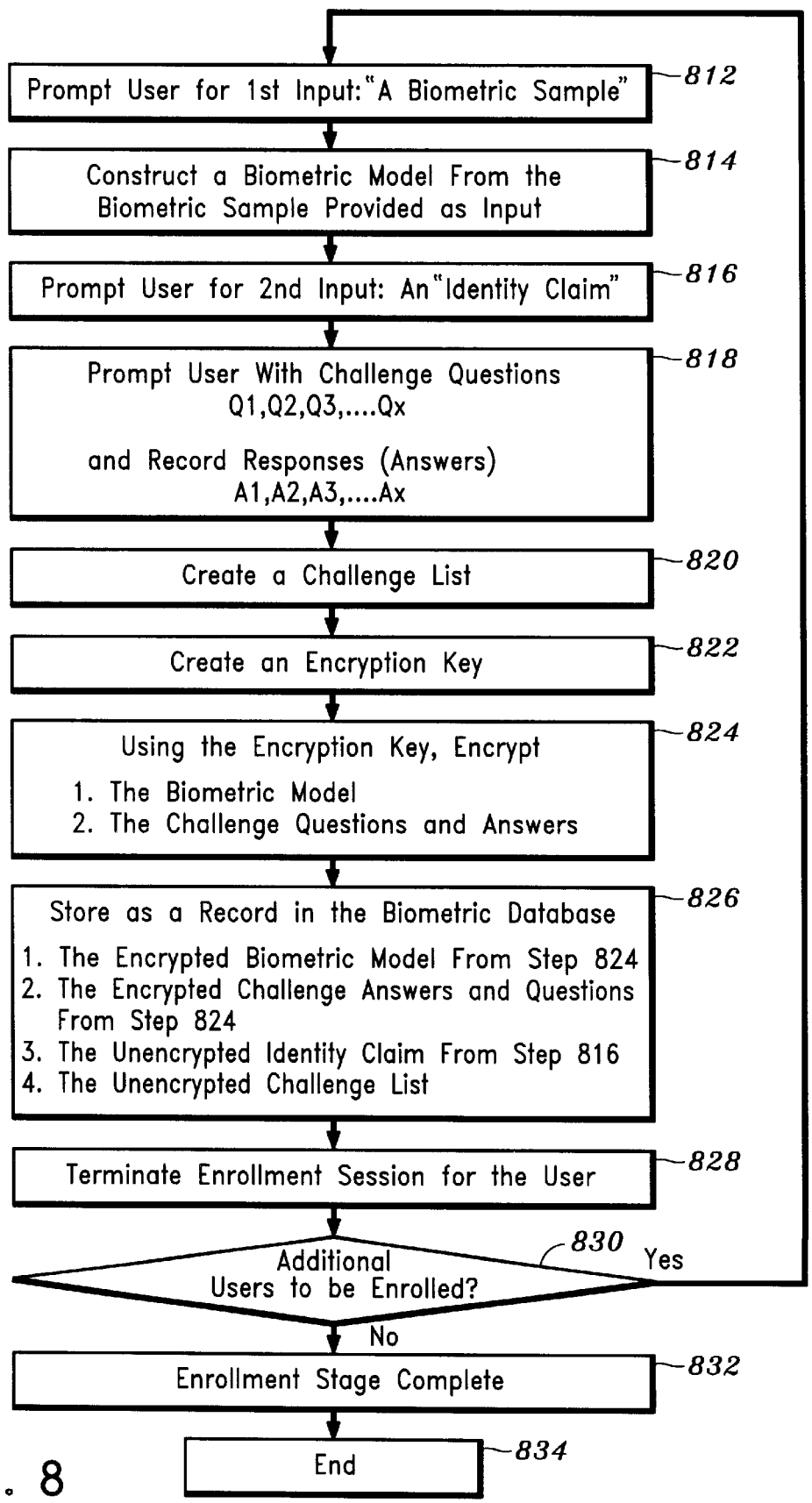
FIG. 8 is a flowchart illustrating method steps associated with enrolling an individual in accordance with an alternative biometric authentication system according to the present invention.

FIG. 8 is a flowchart illustrating the method steps associated with enrolling a user in the database in accordance with the present embodiment. At step 812 an individual who wishes to be enrolled is prompted to provide a current biometric sample (S). At step 814 a biometric model or template (T) is constructed from the provided biometric sample (S). At step 816 an individual is further prompted for a personal identifier (I). At step 818, an individual is further prompted with a series of challenge questions, {q1,q2, . . . ,qn} as described above. The answers to the challenge questions {a1,a2, . . . an) are recorded by the system. At step 820, a challenge list is created. The challenge list is a randomly generated list of m integers, where m is less than the number of challenge questions, where each element of the challenge list is an index to one of the challenge questions {a1,a2, . . . an) posed to the user at block 818. At step 822, an encryption key is created by concatenating those answers to challenge questions whose index matches an element of the challenge list. At step 824, the created encryption key is used to encrypt both the biometric model (T) and the full set of challenge answers. The encryption is performed using any standard secret key encryption algorithm (e.g. DES). At step 826, an encrypted biometric database record is then created including an encrypted biometric model along with the encrypted challenge answers. In addition, the record further includes the personal identifier (I) and the challenge list {i1,i2, . . . ,in) in plain text. Step 830 is a determination step to ascertain whether there are additional individuals to be enrolled in the database. If so, the process loops back to step 812 to enroll another individual. Otherwise, the process is considered complete at step 832.

In an alternate embodiment, should the system declare the individual as unauthorized due to an insufficient match in the biometric, the additional knowledge contained in the database from the current challenge and answer portion could be used to establish another challenge and response session based on the questions not yet asked, and this can be used to bypass or update the biometric model once sufficient information is received to verify the target's identity. If, however, the answers in the challenge set are incorrect, the record cannot be decrypted and further questions cannot be asked.

Figure 9:
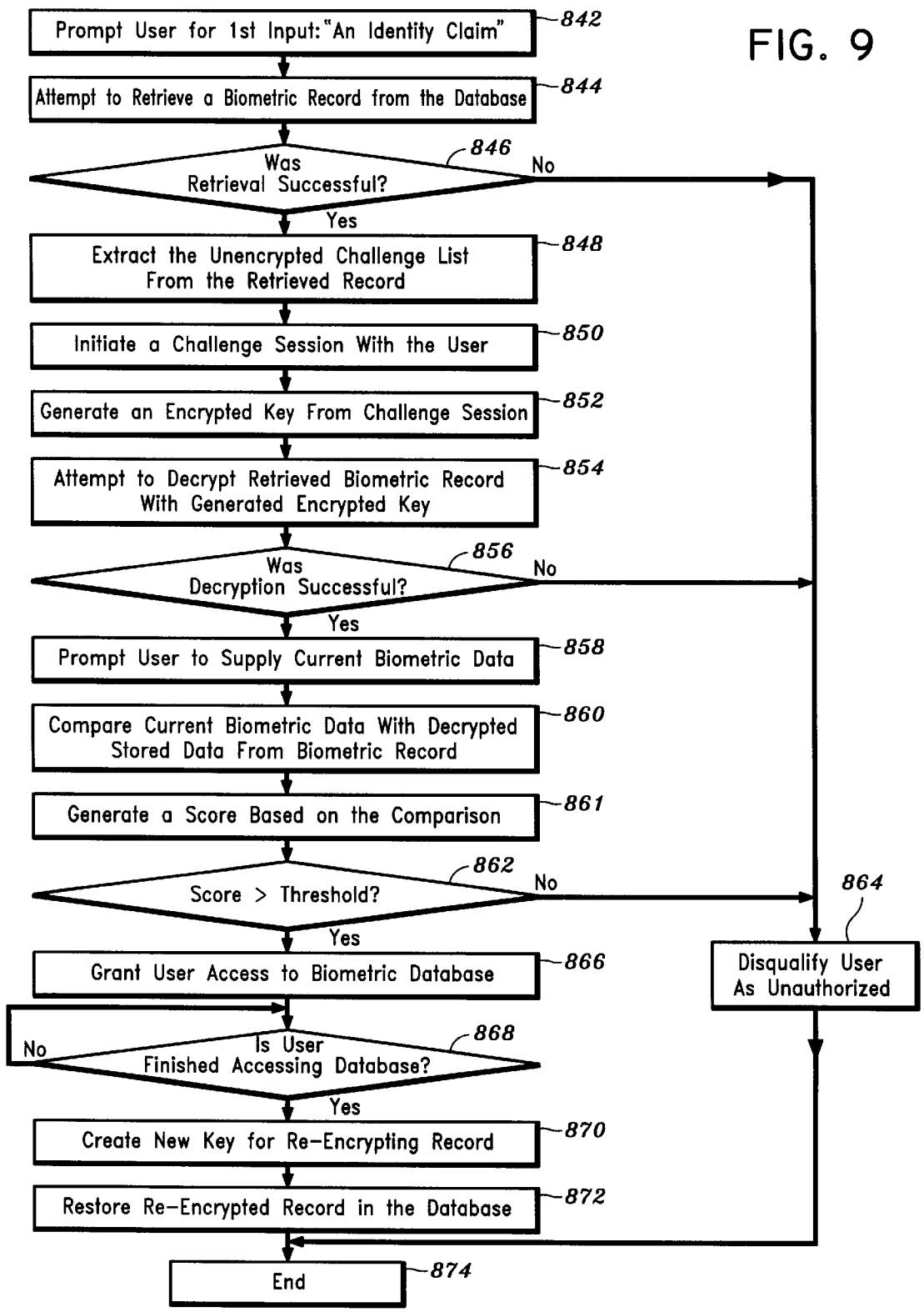
FIG. 9 is a flowchart illustrating method steps associated with authenticating an individual in accordance with an alternative biometric authentication system according to the present invention.

FIG. 9 is a flowchart illustrating the method steps associated with authorizing an individual in accordance with the present embodiment. At step 842 an individual is prompted for a personal identifier (I). At step 844, the system will attempt to retrieve a biometric record from the database with a personal identifier (I) that matches the personal identifier (I) provided by the individual seeking verification. Step 846 is a decision step to determine if the match was successful. If not, the individual cannot be verified and his or her authorization status is considered as "failed". The verification session terminates at step 864. Otherwise, if a matching record is found, the challenge list, stored as plaintext, is extracted from the record. At step 850, the system initiates a challenge question/answer session with the individual. That is, the system prompts the individual with challenge questions whose index matches one of the elements of the challenge list. For example, if the extracted challenge list consists of elements (1,5,6) then the system would challenge the individual with challenge questions 1,5 and 6. At step 852, the system then creates a decryption key by concatenating the answers provided by the user. It is to be appreciated that any one incorrect response at step 852 will result in the creation of a decryption key different from that used to encrypt the record at enrollment thereby resulting in disallowing the individual's authorization to access the database. At step 854, the decryption key is used in an attempt to decrypt the encrypted portion of the retrieved record. Step 856 is a decision step to determine whether the decryption was successful. If not, at step 864, the individual cannot be verified and his authorization status is considered "failed". The verification session then terminates at step 874. Otherwise, at step 858, the individual is prompted to provide a current biometric sample (S). At step 860, the current biometric sample (S) is compared with the decrypted biometric model for statistical equivalence. The lower the computed score the higher the statistical equivalence. At decision block 862, if the score is less than some predetermined accept/reject threshold the individual is disqualified on the statistical grounds at step 864, and the process terminates at step 864. Otherwise at step 866, the individual is authorized and granted access to the database. Step 868 is a decision step to determine if the individual has finished accessing the database. The process loops until such time. Prior to re-storing the record in the database, a new encryption key is generated at step 870. The new encryption key is created by randomly selecting a different random set of questions from the set of challenge questions thereby forming a new challenge list. The previously provided answers whose index match the elements of the new challenge list are then concatenated to create a new encryption key for the purpose of re-encrypting the retrieved record prior to restoring it in the database.

According to another embodiment of the present invention, tolerance is given to mistakes in answering the challenge questions. In this embodiment an m out of n question threshold test is established whereby if an individual answers any m questions correctly out of a list of n challenge questions the encryption key can be re-generated from the correctly answered questions. This differs from the previous embodiment whereby an individual was required to answer each and every challenge question correctly, and failing to do so resulted in a defective decryption key. That is, a decryption key that is not identical to the encryption key used to encrypt the record.

The motivation for such the (m,n) threshold test of the present embodiment arises from the fact that an individual for one reason or another may have failed to correctly recall certain personal information, or information may have changed from the point in time it was first stored in the system at the enrollment period. This embodiment considers these and similar situations to give the individual an additional opportunity to successfully satisfy the challenge and answer session.

Figure 10A:
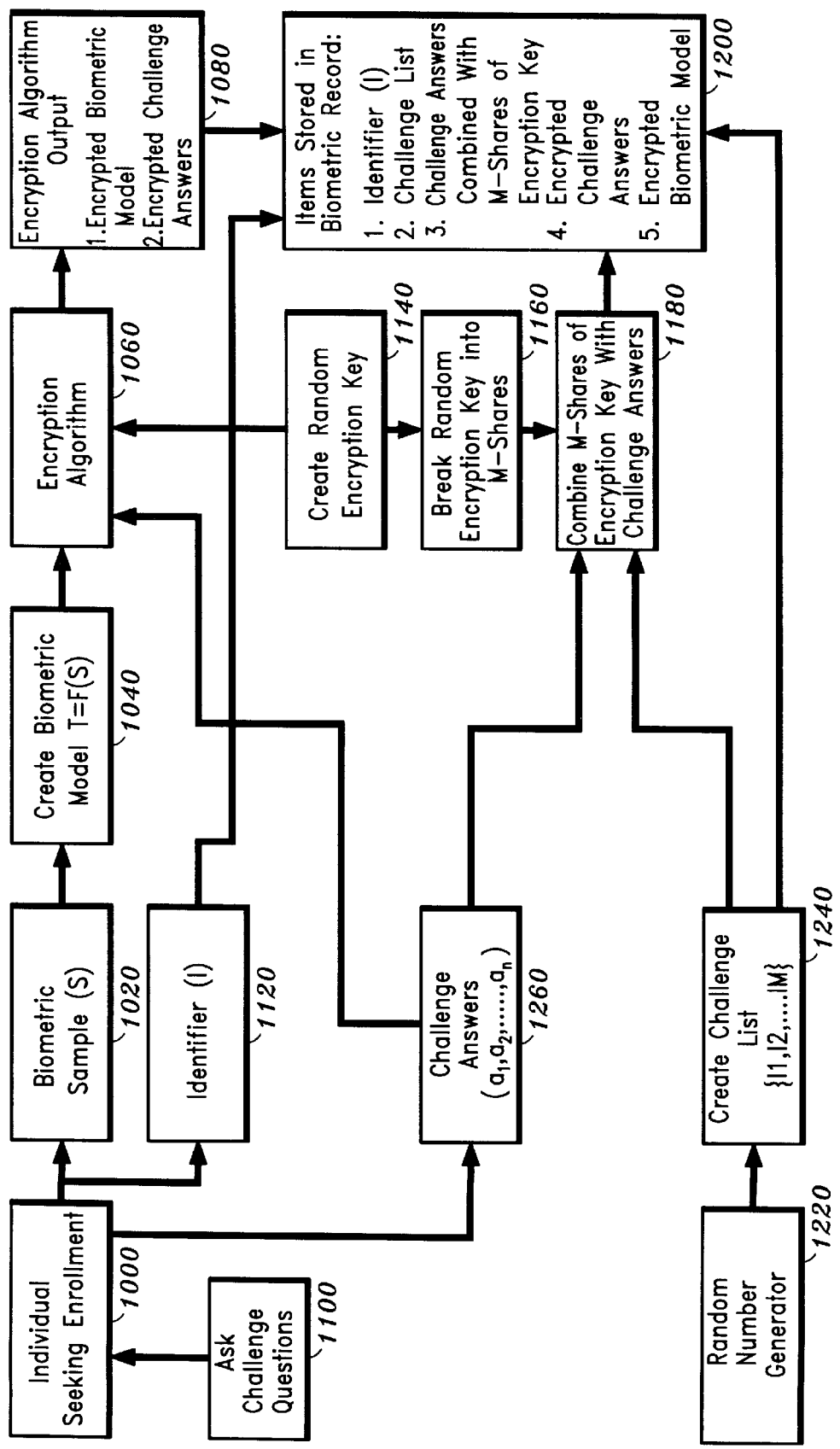
FIGS. 10a and 10b illustrate process steps associated with enrollment and authorization according to another alternative embodiment of the present invention.

Referring to FIG. 10a, a block/flow diagram is shown of the enrollment process according to the present embodiment of the present invention. In block 1000, an individual wishing to enroll in the database is shown. The individual provides as input a biometric sample (S) and a personal identifier (I) 1120. In process block 1040 a biometric model, $T=f(S)$, is created from the provided biometric sample (S). In process block 1100 the individual is prompted with a series of challenge questions, $\{q1,q2,\ldots,qn\}$, similar to that described in the previous embodiment. The answers to the challenge questions are recorded by the system, $\{a1,a2,\ldots an\}$ at block 1260. The challenge answers are encrypted at block 1060 and included as part of the biometric record at block 1200. In block 1220, a random number generator generates m values, where m is some positive integer value less than the total number of questions posed to the user at block 1100, (m<n). The m random numbers generated at block 1220 are supplied to block 1240 to form a challenge list, $\{i_1,i_2,\ldots i_m\}$. Each member of the challenge list is an index to one of the challenge questions posed to the user at block 1100. The challenge list is both stored in unencrypted form as part of the biometric record at block 1200, and further supplied to block 1180 to select answers those challenge answers from block 1260 whose index corresponds to the elements of the challenge list. For example, if the user answered ten challenge questions, and assuming that the random number generator generated m=3 values $\{3,5,6\}$, then challenge answers $\{3,5,6\}$ would be combined at block 1180.

In block 1140, a random encryption key (k) is generated and provided as input to the encryption algorithm at block 1060, and further provided at block 1160. Block 1160 describes a process whereby the randomly generated encryption key (k) is broken into n-shares. The n-shares of the key will then be provided as input to block 1180 where each individual share of the key will be combined with one of the n challenge questions. The challenge answers are preferably combined with the n-shares of the key by an exclusive-or operation, however, other embodiments may define the method of combining the shares by any means familiar to those of ordinary skill in the art.

Figure 10B:
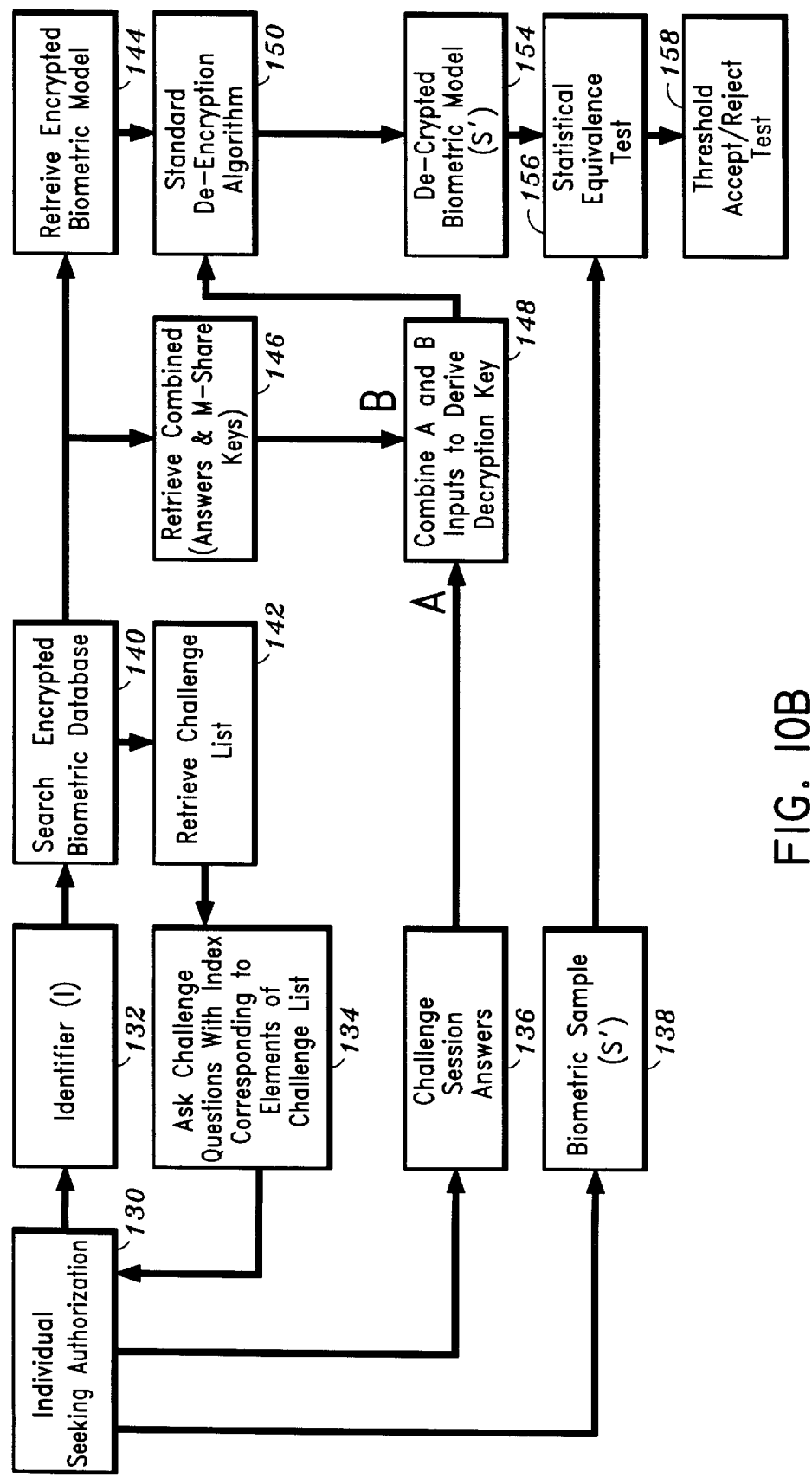

At block 1040, the biometric model (S) is encrypted $T=f(S)$, using any encryption algorithm, well known in the art. The encryption algorithm generates an encrypted biometric model, $E_k(T)$, is generated at block 1080 and stored as part of the biometric record at block 1200. Referring now to FIG. 10b, a system block diagram is illustrated describing the process steps associated with verification in accordance with the present embodiment. The individual seeking verification at block 130 provides an identifier (I) at block 132.

At block 140 the biometric database will be searched to find a matching record using the identifier (I) input as an index. If a matching biometric record is found, two items from the matching record will be retrieved. Block 142 describes the first retrieved item, the challenge list. The challenge list is provided as input to block 134 where the system initiates a challenge/response session with the individual seeking authorization. At block 134, the individual will be asked challenge questions whose index correspond to the elements of the challenge list. At block 148, the individual's responses to the challenge questions are combined using exclusive-or with the m-shares of the encryption key. At block 148 the "A" and "B" inputs from blocks 146 and 136 respectively, are then combined to form decryption key (k'). It is to be appreciated that if the individual answers less than m questions correctly, the resulting decryption key (k') will not be capable of successfully decrypting the record.

In the situation where the user answers at least m of n questions correctly, the full decryption key (k') can be re-generated and will be used to successfully extract the decrypted biometric model (T) at block 150. At block 154, the decrypted biometric model will then be compared with the current biometric sample (S) provided by the user at block 138 for statistical equivalence and a statistical equivalence score is generated therefrom. The lower the computed score the higher the statistical equivalence. At block 158, if the score is more than some predetermined accept/reject threshold the individuals authorization status is declared as "failed". Otherwise, an acceptable score will result in granting the individual 130 access to the general database.

Prior to re-storing the record in the database, a new encryption key and/or new challenge list is generated for the purpose of re-encrypting the retrieved record prior to restoring it in the database.

Alternatively, the biometric, or portions thereof, is utilized as part of the challenge question/answer portion of an authorization session. In other words, some or all of the questions/answers can be derived from the biometric. By their nature, biometric measures are statistical and thus prone to errors during measurement. In addition certain parameters which comprise the biometric inevitably change with time while other biometric parameters remain relatively constant over time. Therefore, utilizing those parameters which are not susceptible to variation with the thresholding challenge and response scheme can be comprised of questions directed to that variation. For example, typical questions might include; 1) How large is your hand 2) How many whirls do you have in your fingerprint 3) Is your voice more like person A or person B. Note that the series of biometric oriented questions does not subsume the biometric equivalence test performed at block 156 of the previous embodiment. Rather, the nature of the biometric questions posed in the challenge question/answer portion would typically be of a less detailed nature and much smaller in overall scope than that performed by the succeeding biometric equivalence test.

As an alternative to using individual information such as password or challenge answers to encrypt the database record, as described heretofore above, a randomly chosen key can be used instead to encrypt the records. These keys will preferably contain a large number of bits, larger than the number of bits attainable by using user supplied information (e.g., passwords, challenge answers) thereby providing security advantages as a result. These large keys may then be stored in a separate database in encrypted form, using user supplied information (e.g., passwords, challenge answers) to encrypt the keys. It is to be appreciated that the present embodiment creates a layer of indirection that is advantageous in that only the large keys need to be re-encrypted at the conclusion of each authorization session rather than the entire database record.

Figure 11:
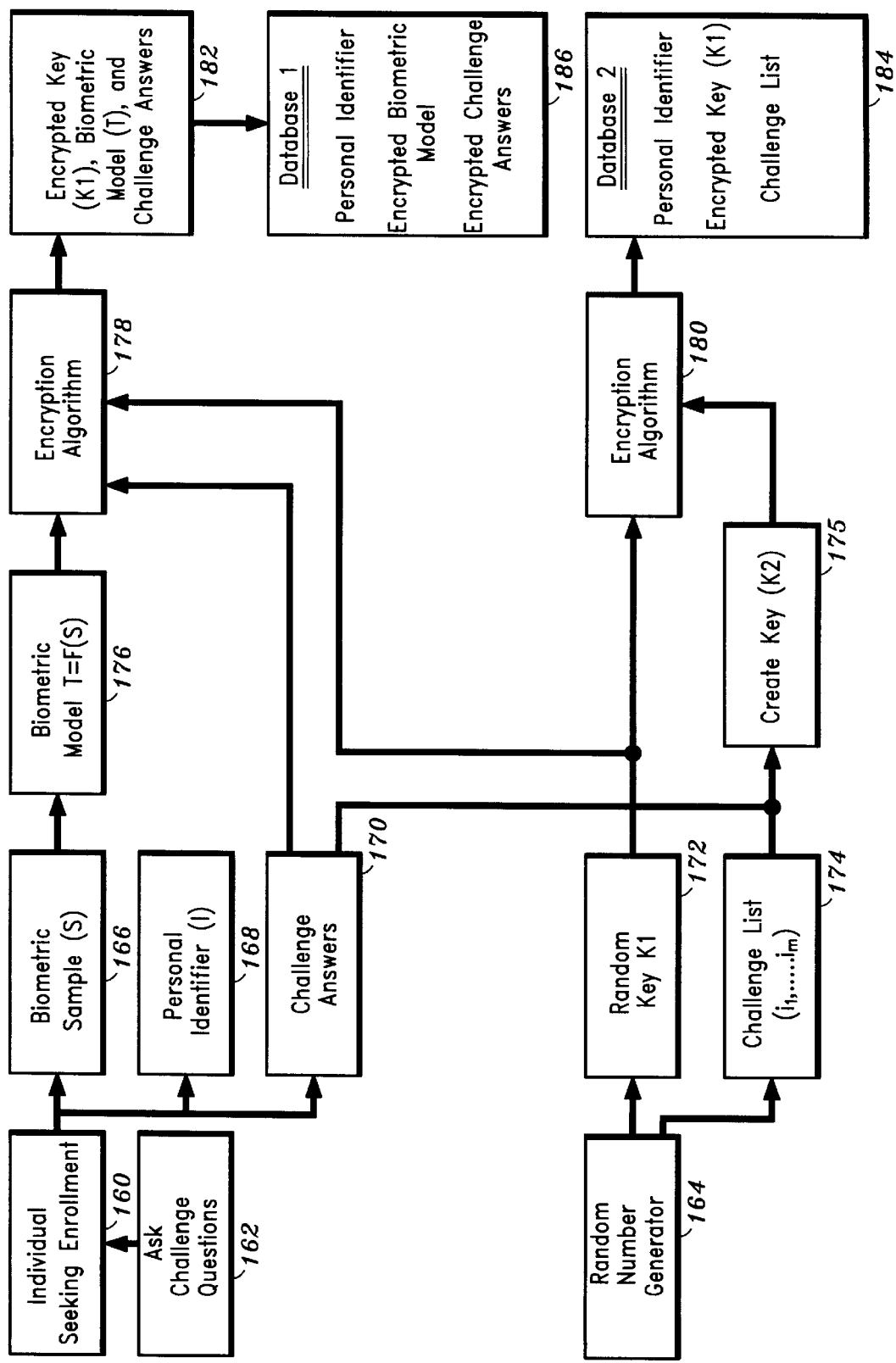
FIG. 11 illustrates process steps associated with enrollment in accordance with another alternative embodiment of a biometric authentication system according to the present invention.

Referring now to FIG. 11, in block 160, an individual wishing to enroll in the database is shown. The individual provides as input a biometric sample (S) 166, and an identifier (I) 168. In process block 176 a biometric model, T=f(S), is created from the provided biometric sample (S). In process block 162 the individual is prompted with a series of challenge questions, $\{q1, q2, \ldots, qn\}$, similar to that described in the previous embodiments. The answers to the challenge questions are recorded by the system, $\{a1, a2, \ldots, an\}$ at block 170. The challenge answers are provided as output to both blocks 178 and 175. At block 178 the challenge answers are encrypted and included as part of the biometric record at block 186. At block 175, the challenge answers are provided from block 174.

The challenge list at block 174 is created in a manner similar to that described above. A random number generator, block 164, generates m values, where m is some positive integer value less than the total number of questions posed to the user at block 162, (i.e. "n"). The m randomly generated numbers are supplied to block 174 to form a challenge list, $\{i_1, i_2, \ldots, i_m\}$. As previously stated, each member of the challenge list is used as an index to one of the questions posed to the user at block 162.

At block 175, the challenge answers are concatenated using the challenge list as previously described to create encryption key k2. This key is then provided as input to the encryption algorithm at block 180 where it will be used to encrypt a larger randomly generated encryption key, k1 at block 172.

Subsequent to encrypting key k1 with key k2, the encrypted key k1 is preferably stored in a separate database, database 2 along with the challenge list. It is to be appreciated that the large random key, k1, is created once and never updated. By contrast, encryption key, k2, can be updated by choosing a new challenge list after each successful authorization session.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for the secure handling of data, comprising the steps of:
   (a) acquiring a biometric database of personal identifiers and data comprising:
      (i) acquiring an enrollment biometric sample;
      (ii) acquiring an enrollment record identifier;
      (iii) acquiring encryption key generation data;
      (iv) creating a biometric model from said enrollment biometric sample;
      (v) creating a first encryption key from said encryption key generation data;
      (vi) performing an encryption operation on said biometric model to yield an encrypted biometric model;
      (vii) storing a biometric record in said database wherein said record is comprised of said encrypted biometric model and said record identifier,
   (b) verifying the identity of a user desiring access to a secured resource, comprising the steps of:
      (i) acquiring a current biometric sample;
      (ii) a current record identifier;

(iii) a decryption key generation data;
(iv) identifying a matching biometric record whose enrollment record identifier matches the current record identifier;
(v) creating a decryption key from said decryption key generation data;
(vi) performing a decryption operation on said matching biometric record to extract a decrypted biometric model from said record; and
(vii) comparing said decrypted biometric model with the current biometric sample to verify the identity of the user for authorizing access to the secured resource.

2. The method of claim 1, wherein said biometric model is comprised of a plurality of statistical parameters.

3. The method of claim 1, wherein when no matching biometric record is identified, the user is denied access to the secured resource.

4. The method of claim 1, wherein the comparison step further comprises:
generating a statistical equivalence score; and testing said statistical equivalence score against a pre-determined threshold to determine whether to grant said user access to said secured resource.

5. The method of claim 1, wherein the step of acquiring an enrollment biometric sample is obtained indirectly from one or more user supplied input responses.

6. The method of claim 1, wherein the step of acquiring a current biometric sample is obtained indirectly from one or more user supplied input responses.

7. The method of claim 1, wherein the step of acquiring an enrollment biometric sample is derived directly from a user supplied bio-characteristic.

8. The method of claim 1, wherein the step of acquiring a current biometric sample is derived directly from a user supplied bio-characteristic.

9. The method of claim 1, further comprising:
(a) creating a re-encryption key;
(b) performing an encryption operation on said decrypted biometric model to yield a re-encrypted biometric model, said encryption operation using said re-encryption key as input; and
(c) replacing said record in the biometric database with said re-encrypted biometric model.

10. The method of claim 1, wherein said encryption key generation data is a secret user supplied password.

11. The method of claim 1, wherein said encryption key generation data includes a series of answers provided by said user to a series of challenge questions.

12. The method of claim 1, wherein the step of generating a first encryption key further comprises:
collecting a subset of user provided answers to challenge questions, wherein said subset is comprised of those answers whose index corresponds to each integer from a first challenge list; and
concatenating said collected answers to form said first encryption key.

13. The method of claim 1, further comprising:
encrypting a series of answers to a series of challenge questions;
storing said encrypted answers as part of said biometric record; and
storing said challenge list as part of said biometric record.

14. The method of claim 12, where the integers which comprise the first challenge list are randomly generated.

15. The method of claim 1, wherein said encryption key generation data comprises a randomly selected first encryption key.

16. The method of claim 15, wherein the step of storing the biometric record further comprises:
dividing the randomly selected first encryption key into a plurality of n shares, where n equals the number of challenge questions;
combining each of said n shares of said first encryption key with one of the answers to said series of challenge questions thereby forming combined key shares; and
storing said plurality of combined key shares.

17. The method of claim 1, wherein the step of creating a decryption key from said decryption key generation data further comprises:
retrieving combined key shares from an encrypted biometric record;
retrieving a challenge list from said biometric record;
asking the user challenge questions whose index corresponds to integers from said challenge list;
collecting the answers to said challenge questions; and
deriving said decryption key by combining said retrieved combined key shares with said answers.

18. The method according to claim 1, wherein said encryption key generation data comprises answers to one or more challenge questions directed to a bio-characteristic of said user.

19. The method according to claim 1, wherein said first encryption key is a random number with magnitude greater than 127 bits.

20. The method according to claim 1, further comprising:
encrypting said biometric model using said first encryption key;
encrypting answers to a series of challenge questions using said first encryption key;
encrypting said first encryption key with a second encryption key;
storing said encrypted biometric model and said encrypted answers in one of a first and second database; and
storing said encrypted first encryption key in one of a first and second database, wherein the database is different from the selected database from the previous storing step.

21. The method according to claim 20, further comprising:
creating a new challenge list after a successful decryption operation on an encrypted biometric record;
creating a new encryption key using decrypted answers to challenge questions corresponding to said new challenge list; and
re-encrypting said first encryption key with the new encryption key.

22. A program storage device readable by a computer, tangibly embodying a program of instructions executable by the computer to perform method steps for secure handling of data, the method comprising the steps of:
(a) acquiring a biometric database of personal identifiers and data comprising:
acquiring an enrollment biometric sample, an enrollment record identifier, and encryption key generation data;
creating a biometric model from said enrollment biometric sample; creating a first encryption key from said encryption key generation data; performing an encryption operation on said biometric model to yield an encrypted biometric model;

storing a biometric record in said database wherein said record is comprised of said encrypted biometric model and said record identifier, (b) verifying the identity of a user desiring access to a secured resource, comprising the steps of:

acquiring a current biometric sample, a current record identifier, and a decryption key generation data;

identifying a matching biometric record whose enrollment record identifier matches the current record identifier;

creating a decryption key from said decryption key generation data; performing a decryption operation on said matching biometric record to extract a decrypted biometric model from said record; and comparing said decrypted biometric model with the current biometric sample to verify the identity of the user for authorizing access to the secured resource.

\* \* \* \* \*